Patent 3,095,511

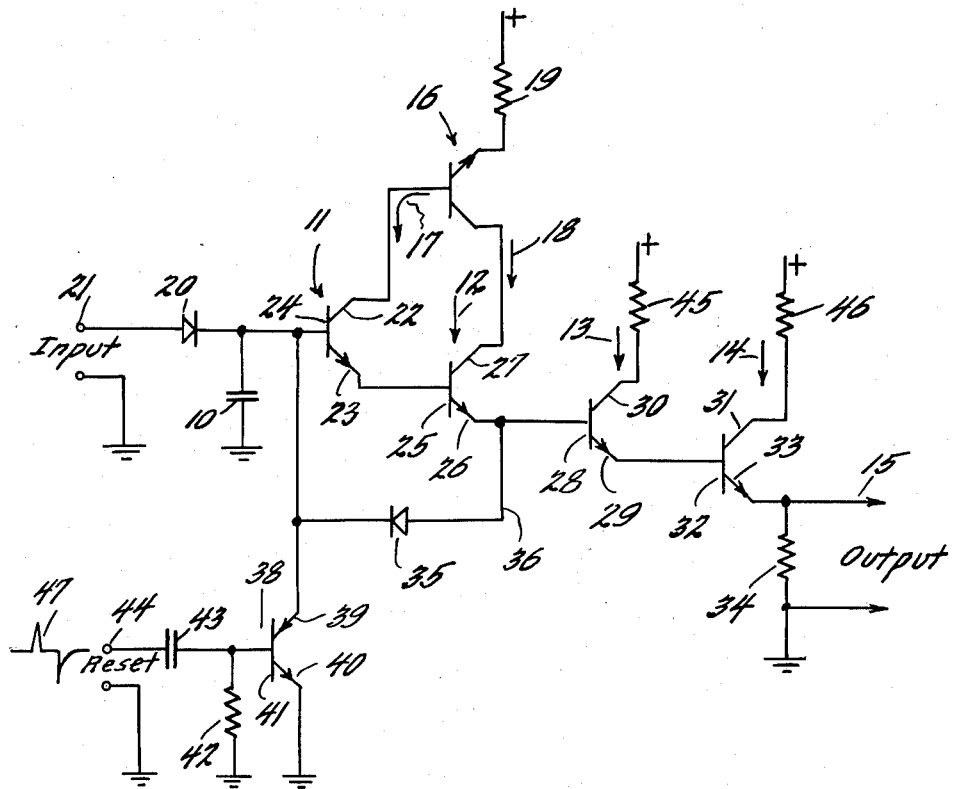

3,095,511
CASCADED EMITTER-FOLLOWERS WITH CURRENT CONTROL MEANS FOR EFFECTING TRANSMISSION OF SIGNALS WITHOUT APPRECIABLY LOADING INPUT
Neil E. Maestre, Levittown, N.J., assignor to Vector Manufacturing Company, Incorporated, a corporation of Pennsylvania
Filed Sept. 22, 1960, Ser. No. 58,598
12 Claims. (Cl. 307—88.5)

This invention relates generally to high impedance read-out circuits for accurately transmitting a voltage from a capacitor of like storage device or circuit without discharging or appreciably loading such source, and more particularly to improvements in such circuitry providing a substantially constant magnitude read-out error over a wide range of read-out voltages.

It is accordingly a principal object of the invention to provide an extremely high impedance read-out circuit for accurate transmission of a signal without appreciable loading of the signal source.

A further object is to provide such a circuit that effectively increases impedance with increase in voltage of the source to maintain the absolute magnitude of the read-out error substantially constant over a wide range of source voltage.

Another object is to provide such an electronic circuit employing a minimum number of components and occupying the smallest size and lightest weight.

A still further object is to provide such a circuit that may be comprised exclusively of solid state components.

Other objects and additional advantages will be more readily understood by those skilled in the art after a detailed consideration of the following specification taken with the accompanying drawing illustrating in electrical schematic form one preferred embodiment of the invention.

Referring now to the drawing, there is shown in FIG. 1, a capacitor 10 adapted to be charged by an input signal over line 21 to a level representing a given quantity of intelligence, and a read-out circuit comprised of a plurality of transistors, such as 11, 12, 13, and 14, for accurately conveying the voltage signal from the capacitor source 10 to an output circuit leading from line 15. According to the present invention, the read-out circuit is constructed in such manner that the voltage charge on capacitor 10 is not appreciably discharged through the read-out circuit by reason of the extremely high impedance presented to the capacitor 10 and the read-out circuit additionally provides an extremely accurate output voltage on line 15 proportional to the voltage on the capacitor.

Moreover, according to the invention, the read-out circuit is stabilized to the voltage on capacitor 10 whereby its impedance effectively increases with an increase in the voltage on capacitor 10 to increase the discharge time constant in the capacitor circuit thereby to more accurately maintain the absolute value of the read-out error constant over a wide range of stored voltages on the capacitor 10.

Briefly considering the nature of capacitor discharges for an understanding of this circuit, it is well known that a capacitor discharges in an exponential manner with time and that the rate of such discharge is also exponential and proportional to the R-C time constant or the product of the effective capacitive and resistive values in the discharge path. Consequently, by providing an extremely high resistive read-out circuit, the capacitor voltage will fall or discharge at a very slow rate and the error at read-out will accordingly be quite small. On the other hand, the absolute value of the error at read-out will be in proportion to the magnitude of the voltage stored on the capacitor 10 for the reason that although the rate of discharge is the same regardless of the magnitude of the stored voltage, the actual voltage drop during a given time interval is greater for larger stored signals due to the nonlinear nature of the capacitor discharge curve. For this reason, it is desired that the effective resistance in the capacitor discharge path be increased as the voltage stored in the capacitor is increased thereby to maintain the absolute value of the read-out error at a known constant value despite different levels of charged voltage on the storage capacitor 10.

To provide this voltage stabilized read-out circuit according to the invention, the first two transistors 11 and 12 leading from the capacitor 10 are preferably connected in an emitter-follower circuit arrangement with the emitter electrode 23 of first transistor 11 being connected to the base electrode 25 of transistor 12, with the input or voltage on storage capacitor 10 being directed to the base electrode 24 of transistor 11, and with the output being taken from the emitter electrode 26 of transistor 12. With this arrangement as thus far described, the input impedance presented to the capacitor 10 is very high and the capacitor will accordingly discharge very slowly. However, in the absence of further control, the discharge impedance through the transistors would remain substantially constant and the magnitude of the error at read-out would vary according to the magnitude of the voltage on storage capacitor 10.

To eliminate this variable magnitude error, the transistors 11 and 12 are differentially energized by currents 17 and 18 fed to their collector elements 22 and 27, respectively, whose sum is always maintained substantially constant. Consequently, if the current 17 energizing transistor 11 should tend to increase, the current 18 feeding transistor 12 is decreased by the same amount. A similar but opposite result follows if the current 18 to transistor 12 increases resulting in the current 17 to transistor 12 being correspondingly decreased.

These differentially variable currents are obtained from the base electrode and collector electrode of a control transistor 16, whose emitter electrode is adapted to be energized by a constant current. This constant is obtained by connecting the emitter electrode of the control transistor 16 in series with a large dominating resistance 19 and thence to a constant voltage source (not shown). The value of resistance 19 is considerably larger than is presented by the control transistor 16 and the emitter follower transistors and consequently the current flow through resistor 19 and to the emitter electrode of control transistor 16 is substantially constant.

This constant current drawn from the power source (not shown) is divided in the control transistor 16 with a portion 17 thereof flowing from the emitter to base junction of transistor 16 and thence to the collector electrode 22 of transistor 11, and the remainder thereof 18 flowing from the emitter to collector junctions of control transistor 16 to the collector electrode 27 of transistor 12. Consequently, since the current flow into control transistor 16 is limited and controlled by large resistor 19, the sum of the two components 17 and 18 thereof is always maintained constant and as one component tends to increase, the other correspondingly decreases.

In operation, the differential control of currents 17 and 18 to the emitter-follower connected transistors 11 and 12 functions in the manner of a regulator to maintain the current relationships in the transistors 11 and 12 substantially constant regardless of the voltage stored on capacitor 10. By maintaining these current relationships constant despite variations in the input voltage, the discharge impedance of the follower circuits presented to the capacitor 10 effectively increases as the voltage on capacitor 10 increases since the small discharge current drawn from the capacitor 10 is maintained substantially constant despite increases in the charge on capacitor 10. More specifically, as a larger input voltage is stored on capacitor 10, the voltage level being fed to the base electrode 24 of first transistor 11 is raised whereby transistor 11 tends to draw additional current 17 from its collector electrode 22 to its emitter electrode 23. However, any increase in the current 17 results in a corresponding decrease in current 18 passing through transistor 12 which, in turn, increases the base to emitter impedance of transistor 12. This latter change counteracts the tendency of the transistor 11 to draw additional discharge current from capacitor 10 and through the base 24 to the emitter electrode 23 whereby the net result is that the discharge impedance through the transistors 11 and 12 from the capacitor 10 is effectively raised to increase the time constant of the circuit and maintain the magnitude of the read-out voltage error on emitter element 26 substantially constant.

Returning to the drawing, the read-out voltage at emitter 26 is thence fed in cascade to two additional transistors 13 and 14 connected in emitter follow relationship with each other and with the first two transistors 11 and 12 and the read-out signal is ultimately developed across load resistor 34 and fed over output line 15 to a suitable utilization means (not shown).

More specifically, the voltage signal developed at emitter electrode 26 of transistor 12 is first directed to the base electrode 28 of transistor 13 and thence passes from the emitter electrode 29 thereof to the base 32 of transistor 14 and finally is transmitted from the emitter 33 of the latter transistor to the output line. Each of transistors 13 and 14 is individually energized from the power source (not shown) at the collector electrodes thereof 30 and 31 and through separate resistances 45 and 46, respectively.

For resetting the capacitor 10 and read-out circuit in preparation for the storage and read-out of the next succeeding input intelligence signal over input line 21, there is provided a reset pulse responsive solid state transistor switch means for simultaneously connecting the capacitor 10 and emitter 26 to a fixed potential reference level, such as ground. As shown, the reset transistor 38 is preferably a solid state silicon or the like switch of the variety termed by one manufacturer as a "Transwitch." Such devices are usually comprised of three electrodes 39, 40, and 41, with one of the electrodes 41 serving as a voltage responsive control and the other two electrodes 39 and 40 serving as switch terminals. When the control 41 is deenergized, a high impedance is presented between electrodes 39 and 40 whereas when the control 41 is triggered by a pulse, the impedance is made extremely small. Such devices also possess the characteristic of remaining conductive after being triggered, somewhat in the manner of a thyratron gas tube but being capable of being extinguished by a triggering pulse of opposite polarity applied to the control electrode 41.

In the preferred reset circuit as illustrated, the upper electrode 39 of the switch 38 is connected to the charging side of storage capacitor 10 and also connected through a diode 35 to the emitter electrode 26 of transistor 12 over line 39. The lower electrode 40 is connected to ground potential whereby as the switch 38 is triggered into operation the capacitor 10 and emitter electrode are simultaneously short-circuited to ground potential. The reset switch 38 is adapted to be energized by a positive going impulse directed over reset line 44 and thence through coupling capacitor 43 and resistor 42 leading to the control electrode 41 of switch 38. For extinguishing the switch 38 shortly after the capacitor 10 and read-out circuit are reestablished at ground reference potential, the reset impulse includes a negative going portion occurring slightly after the positive trigger portion, as illustrated by the reset waveform numbered 47 located at the left of the reset circuit. This negative going portion of the pulse 47 energizes the control electrode 41 of switch 38 to extinguish the switch 38 thereby readying the storage capacitor 10 and read-out circuit for the next successive function.

Although but one preferred circuit embodiment has been illustrated and described as required by the patent laws, it is believed evident that many variations may be made without departing from the spirit and scope of the invention. Accordingly, this invention should be considered as being limited only by the following claims.

What is claimed is:

1. A high impedance read-out circuit comprising a pair of electron valves interconnected in cascaded connection, each valve having a pair of current carrying electrodes and at least one additional control electrode being energizable to regulate the flow of electrons therebetween, means interconnecting a current carrying electrode of the first valve to the control electrode of the second valve, means for coupling an input signal to the control electrode of the first valve, an output means coupled to one of the current carrying electrodes of the second valve, and a current generating means for differentially energizing the remaining current carrying electrodes of both valves, said differential energizing means providing a decreased current flow to the second valve when the current flow to the first valve is increased and the reverse, whereby in response to an increase in the input signal, the effective input impedance of the cascaded valves is increased.

2. In the circuit of claim 1, a plurality of additional valves being interconnecting in similar cascaded relation with each other and with said pair of valves, said means for coupling the input signal including a capacitor means, and switch means responsive to a clear impulse for discharging said capacitor and said output voltage coupling means simultaneously.

3. In the circuit of claim 1, said current generating means including a transistor having at least three electrodes, a large current limiting impedance connected in series with one of said electrodes and being energizable by a substantially constant energizing potential, and means interconnecting a second of said transistor electrodes to transmit current to the current carrying electrode of one of said pair of valves and a third of said transistor electrodes to transmit current to the current carrying electrode of the other of said pair of valves.

4. A solid state voltage storage circuit comprising: a first and second transistor in cascaded connection, each having an emitter, collector, and base electrodes, means interconnecting the emitter electrode of the first transistor to the base of the second transistor, means coupling an input signal voltage to the base electrode of the first transistor, means coupling an output voltage from the emitter of the second transistor, and a current producing means for differentially energizing the collector electrodes of both transistors in such manner that as the current to one is varied the current to the other is varied in the opposite direction, whereby in response to an increase in the input voltage, the impedance presented by the cascaded transistors to the input voltage effectively increases to reduce loading on the input source, and the output from the second transistor accurately transmits the input voltage.

5. In the circuit of claim 4, means responsive to an impulse for simultaneously connecting the base electrodes of the first transistor and the emitter electrode of the second transistor to a common potential level for resetting the circuit.

6. In the circuit of claim 4, said constant current producing means comprising a transistor having base, collector, and emitter electrodes, a current limiting impedance connected to one of said electrodes and being energizable by a constant source of potential, and means coupling another of said electrodes to the collector electrode of said first transistor, and means coupling the remaining electrode to the collector electrode of said second transistor.

7. A high impedance voltage read-out circuit that effectively increases impedance responsively to increases in the input voltage comprising: a pair of transistors, each transistor having a base, emitter, and collector electrodes, means coupling an input voltage to the first transistor and coupling an output voltage from the second transistor, means interconnecting said transistors in cascaded connection with a gain from the input voltage to the output voltage of less than one and a high impedance from input to output, and means differentially energizing said first and second transistors by a constant current source whereby the sum of current flow to both said transistors is maintained substantially constant, whereby as the input voltage is increased the effective input to output impedance is increased and the voltage output is maintained for an accurate read-out of the input.

8. In the circuit of claim 7, said differential energizing means comprising a transistor having base, collector, and emitter electrodes, a large current limiting impedance energized by a constant energizing source for directing a constant current to one of said electrodes, means connecting a second electrode to transmit a portion of said constant current to one of said pair of transistors and means connecting the remaining electrode to transmit the remaining portion of said constant current to the other of said pair of transistors.

9. In the circuit of claim 7, a transistor switch means energizable by a clear impulse for simultaneously connecting the input voltage coupling means and the output voltage coupling means to a common potential level thereby to reset the circuit.

10. In the circuit of claim 7, a plurality of additional transistors interconnected in cascade in the same manner as said pair of transistors.

11. A high impedance read-out circuit for charged capacitors comprising a pair of transistors, each having collector, emitter, and base electrodes, coupling means interconnecting said transistors in an emitter follower circuit with the emitter electrode of the first transistor connected to the base electrode of the second; with the base of the first transistor energizable by said charged capacitor; and with an output voltage taken from the emitter of the second transistor, and means for differentially energizing the collector electrodes of the first and second transistors with currents whose sum is maintained substantially constant, said differential energizing means comprising a control transistor having base, emitter, and collector electrodes, a large impedance energizable by a substantially constant voltage for directing a constant current to one of said electrodes of the control transistor, means coupling another electrode of the control transistor to the collector electrode of the first transistor, and means coupling the remaining electrode of the control transistor to the collector electrode of the second transistor.

12. In the circuit of claim 11, reset means responsive to an impulse for simultaneously connecting the input and output of the emitter follower to a common potential level, said means comprising a transistor switch means interconnecting said input with said constant voltage level, and a solid state diode interconnecting said output and input.

References Cited in the file of this patent
UNITED STATES PATENTS
2,983,831   Walton ------------------ May 9, 1961